Patented Jan. 9, 1923.

1,441,605

UNITED STATES PATENT OFFICE.

CLARENCE D. SHAFFER, OF KALAMAZOO, MICHIGAN, ASSIGNOR TO TEXTILE, LEATHER & METAL PRESERVER CO., OF KALAMAZOO, MICHIGAN.

WATERPROOFING COMPOSITION AND PROCESS OF MAKING.

No Drawing. Application filed December 27, 1921, Serial No. 525,210. Renewed December 1, 1922.

*To all whom it may concern:*

Be it known that I, CLARENCE D. SHAFFER, a citizen of the United States, residing at the city and county of Kalamazoo, State of Michigan, have invented certain new and useful Improvements in Waterproofing Compositions and Processes of Making, of which the following is a specification.

This invention relates to improvements in water-proofing composition and process of making.

The main objects of the invention are:

First, to provide an improved waterproofing composition which is effective and very durable and may be used to effectively waterproof leather, fabrics and other flexible materials, and is also an effective rust preventive when applied to metals.

Second, to provide an improved waterproofing composition which may be prepared or compounded, without danger to the workers, one which will keep indefinitely and also a composition which is quite economical to produce.

The ingredients of my improved waterproofing composition are a paracoumarone resin or synthetic resin compounded from coal tar distillates, the product preferred by me being commercially known as "cumar," which is a composition of the character indicated, rubber, preferably pure Pará rubber, paraffin wax, and a light hydrocarbon oil such as gasoline, naphtha, kerosene, benzine and the like. These ingredients are preferably combined in approximately the proportions indicated and in the following manner—the "cumar" and paraffin are placed in a retort or other heating receptacle in the proportion of one part "cumar," and two parts paraffin wax. These ingredients are heated to a temperature approximating 320° Fahrenheit, or to such a temperature as will melt the "cumar" and cause the paraffin to mix and combine therewith, the temperature being held until the ingredients are thoroughly melted and united into a homogeneous condition.

To this mixture and while the same is still hot I add two parts rubber, preferably pure Pará rubber, reduced to a syrupy condition such as rubber cement. The rubber may be introduced to the mixture while cold although the mixture should be hot as stated, preferably above 300° Fahrenheit when the rubber is added. The mixture is stirred as the rubber is introduced and the rubber and other ingredients readily combine into a homogeneous mixture.

The mixture is allowed to cool in the open air and about twenty parts hydrocarbon oil such as gasoline added to the mixture, which produces a liquid composition which may be applied to fabrics, leather and other similar materials without in any way changing the character or appearance of the same, but rendering the same waterproof.

The composition may also be used as a rust proof composition, it being applied to rough or unpolished metals as above prepared, but when applied to finished or nickel plate it is preferably further reduced about 100% with a gasoline, naphtha or light hydrocarbon oil.

While I preferably use the "cumar" as stated, other paracoumarone resin may be employed; the proportions set forth may be considerably varied with quite satisfactory results, but I find the proportions indicated highly satisfactory.

Having thus described my invention, what I claim as new and desire to secure by Letters Patent, is:

1. A waterproofing composition comprising one part "cumar," two parts rubber, two parts paraffin, and twenty parts hydrocarbon oil.

2. A waterproofing liquid comprising a paracoumarone resin, rubber, paraffin, and light hydrocarbon oil combined in substantially the proportions described.

3. A waterproofing composition comprising a homogeneous mixture of "cumar," rubber, paraffin, and a light hydrocarbon.

4. A waterproofing composition comprising a homogeneous mixture of "cumar," rubber and paraffin.

5. A waterproofing liquid comprising a paracoumarone resin, rubber, paraffin and a hydrocarbon oil.

6. The process of making water proofing composition consisting of heating "cumar" and paraffin in the proportions of one part "cumar" to two parts paraffin wax to a temperature approximating 320 degrees Fahrenheit, and maintaining the temperature until the ingredients are melted together, adding to the hot mixture two parts rubber reduced to the consistency of thin syrup and mixing to a homogeneous mixture, and adding light hydrocarbon oil in the proportion of approximately four parts of the oil to one part of the mixture.

7. The process of making water proofing composition consisting of heating a paracoumarone resin and paraffin wax to a temperature approximating 320° Fahrenheit until melted together, and adding rubber reduced to the consistency of syrup to the hot mixture and mixing to a homogeneous condition, and adding a hydrocarbon oil.

8. The process of making waterproofing composition consisting of heating a paracoumarone resin and paraffin wax to a temperature approximating 320° Fahrenheit until melted together and adding rubber to the hot mixture and mixing to a homogeneous condition and adding a hydrocarbon oil.

In witness whereof, I have hereunto set my hand and seal.

CLARENCE D. SHAFFER. [L. S.]